United States Patent
Yatake et al.

[11] Patent Number: 6,051,057
[45] Date of Patent: Apr. 18, 2000

[54] INK JET RECORDING INK

[75] Inventors: Masahiro Yatake; William Marritt, both of Nagano, Japan

[73] Assignee: Seiko Epson Corporation, Tokyo-To, Japan

[21] Appl. No.: 09/080,733

[22] Filed: May 18, 1998

[30] Foreign Application Priority Data

| May 16, 1997 | [JP] | Japan | ................................. 9-127695 |
| May 16, 1997 | [JP] | Japan | ................................. 9-127696 |
| Jul. 8, 1997 | [JP] | Japan | ................................. 9-182415 |

[51] Int. Cl.$^7$ ................................................. C09D 11/02
[52] U.S. Cl. ..................................... 106/31.58; 106/31.86
[58] Field of Search .............................. 106/31.58, 31.86

[56] References Cited

U.S. PATENT DOCUMENTS

| 2,083,372 | 6/1937 | Guthmann | ................................. 134/29 |
| 3,291,580 | 12/1966 | Malick | ................................. 44/53 |
| 4,458,176 | 7/1984 | Chenot et al. | ........................... 313/487 |
| 4,597,794 | 7/1986 | Ohta et al. | ................................. 106/20 |
| 4,923,515 | 5/1990 | Koike et al. | ........................... 106/31.58 |
| 5,151,128 | 9/1992 | Fukushima et al. | ................. 106/31.58 |
| 5,156,675 | 10/1992 | Breton et al. | ............................. 106/22 |
| 5,183,502 | 2/1993 | Meichsner et al. | ................... 106/22 K |
| 5,196,056 | 3/1993 | Prasad | ................................. 106/15.05 |
| 5,395,434 | 3/1995 | Tochihara et al. | .................. 106/31.58 |
| 5,501,725 | 3/1996 | Lauw et al. | .......................... 106/31.59 |
| 5,501,726 | 3/1996 | Yui et al. | ............................. 106/31.58 |
| 5,560,771 | 10/1996 | Takemoto et al. | ................... 106/31.58 |
| 5,563,640 | 10/1996 | Suzuki | ................................. 347/45 |
| 5,587,731 | 12/1996 | Yasunaga et al. | ........................ 347/86 |
| 5,749,951 | 5/1998 | Yoshike et al. | ...................... 106/31.58 |
| 5,769,930 | 6/1998 | Sano et al. | ........................... 106/31.58 |

FOREIGN PATENT DOCUMENTS

| 0359365 | 3/1990 | European Pat. Off. . |
| 0506128 | 9/1992 | European Pat. Off. . |
| 0583096 | 2/1994 | European Pat. Off. . |
| 0594081 | 4/1994 | European Pat. Off. . |
| 0739956 | 10/1996 | European Pat. Off. . |
| 0769536 | 4/1997 | European Pat. Off. . |
| 003837 | 6/1981 | Japan . |
| 147861 | 11/1981 | Japan . |
| 15542 | 12/1981 | Japan . |
| 002907 | 1/1990 | Japan . |
| 111165 | 4/1997 | Japan . |

OTHER PUBLICATIONS

Patent Abstracts of Japan of 56–147861 of Nov. 17, 1981.
Patent Abstracts of Japan of Publication No. 58–002364 of Jan. 7, 1983 for JP Patent No. 2–2907 of Jan. 1990.

*Primary Examiner*—Helene Klemanski

[57] ABSTRACT

An ink for ink jet recording and an ink jet recording method are provided which can realize a print having high color density and, even on recycled paper, a print having no significant feathering. The ink for ink jet recording comprises a water-soluble colorant, a water-soluble organic solvent, water, and a compound represented by the following formula (I), (II), or (III):

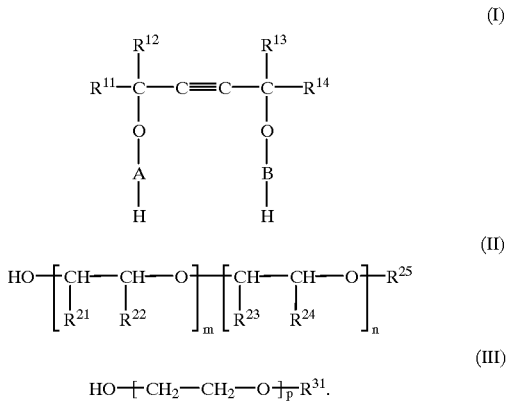

20 Claims, No Drawings

INK JET RECORDING INK

BACKGROUND OF THE INVENTION

1. Field of the Invention

The present invention relates to an ink for ink jet recording and an ink jet recording method which can produce a high-quality printed image on various recording media, for example, plain papers, recycled papers, and coat papers.

2. Background Art

Ink jet recording is a method wherein an ink composition is ejected as a droplet through a fine nozzle to record letters or figures onto the surface of a recording medium. Ink jet recording systems which have been developed and put to practical use include: a method wherein an electric signal Is converted to a mechanical signal using an electrostrictive element to intermittently eject an ink composition reservoired in a nozzle head section, thereby recording letters or symbols on the surface of a recording medium and a method wherein an ink composition, reservoired in a nozzle head section, in its portion very close to the ejection portion is rapidly heated to create a bubble and the ink composition is intermittently ejected by volume expansion created by the bubble to record letters or symbols on the surface of a recording medium.

Properties required of ink compositions used in the above ink jet recording are such that the drying property of the print is good, no feathering is created, good printing can be performed on various recording media, and, in the case of multi-color printing, color-to-color intermixing does not occur.

In particular, prevention of feathering is important for realizing a high-quality image. Paper is likely to create feathering because it comprises fibers that are different from each other or one another in ink penetration. In particular, this tendency is significant for recycled paper because it comprises various fibers having different ink penetration. For this reason, in order to prevent he feathering, various proposals has been made on a reduction in penetration of the ink composition into recording media or an improvement in drying speed of the printed ink image.

For example, Japanese Patent Publication 2907/1990 proposes utilization of glycol ether as a wetting agent, Japanese Patent Publication 15542/1989 proposes utilization of a water-soluble organic solvent, and Japanese Patent Publication 3837/1990 proposes utilization of a glycol ether as a dye solubilizer.

Further, in order to improve the penetrability of an ink for ink jet recording, U.S. Pat. No. 5,156,675 proposes addition of diethylene glycol monobutyl ether, U.S. Pat. No. 5,183, 502 proposes addition of Surfynol 465 (manufactured by Nissin Chemical Industry Co., Ltd. ) as an acetylene glycol surfactant, and U. S. Pat. No. 5,196,056 discloses addition of both diethylene glycol mono-n-butyl ether and Surfynol 465. Furthermore, U. S. Pat. No. 2,083,372 studies and teaches utilization of an ether of diethylene glycol as an ink composition. In this connection, diethylene glycol mono-n-butyl ether is known as butylcarbitol to those skilled in the art, and detailed description thereon is given, for example, in U.S. Patent No. 3,291,580.

For regulating the penetrability of the ink composition containing a pigment, for example, Japanese Patent Laid-Open No. 147861/1981 discloses utilization of a pigment and triethylene glycol monomethyl ether in combination. Japanese Patent Laid-Open No. 111165/1997 discloses utilization of a pigment and an ether of ethylene glycol, diethylene glycol, or triethylene glycol in combination.

On the other hand, a method has been proposed wherein an ink composition is printed on a heated recording medium to rapidly evaporate the solvent component, thereby permitting the ink composition to be rapidly fixed onto the recording medium. Heating, however, is likely to have an adverse effect on recording media, particularly paper. Further, this method involves an additional disadvantage of increased power consumption by heating.

SUMMARY OF THE INVENTION

The present inventors have now found that an ink composition comprising a compound having a specific structure, when used in ink jet printing, can realize a good image having good drying speed and no significant feathering on various recording media, especially recycled papers.

Accordingly, an object of the present invention is to provide an ink composition that can realize a good image on various recording media, especially plain papers.

Thus, according to one aspect of the present invention, there is provided an ink for ink jet recording, comprising at least a water-soluble colorant, a water-soluable organic solvent, water, and a compound represented by the following formula (I), (II), or (III):

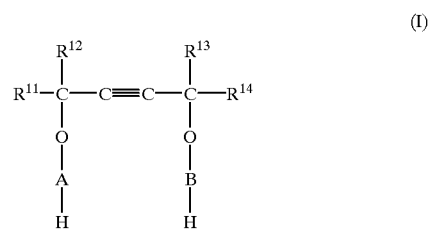

wherein $R^{11}$, $R^{12}$, $R^{13}$, and $R^{14}$ each independently represent a $C_{1-6}$ alkyl group, A and B each independently represent a group consisting of an ethyleneoxy group and/or a propyleneoxy group, provided that any one of A and B contains at least one propyleneoxy group, and the total number of ethyleneoxy groups and propyleneoxy groups is 2 to 60;

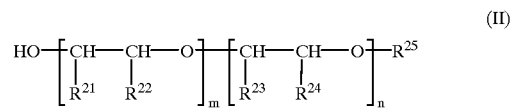

wherein any one of $R^{21}$ and $R^{22}$ represents H with the other substituent representing $CH_3$ or H, and any one of $R^{23}$ and $R^{24}$ represents H with the other substituent representing $CH_3$ or H, when any one of $R^{21}$ and $R^{22}$ represents X, both $R^{23}$ and $R^{24}$ represent H, and when both $R^{21}$ and $R^{22}$ represent H, at least one of $R^{23}$ and $R^{24}$ represents $CH_3$, $R^{25}$ represents a $C_{4-10}$ alkyl group, and m and n each are a number satisfying $2 \leq m+n \leq 6$;

provided that the compounds where $R^{21}$, $R^{22}$, $R^{23}$, and $R^{24}$ all represent H are excluded, and

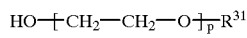

(III)

wherein $R^{31}$ represents a $C_{4-10}$ alkyl group and p is an integer of 3 to 6.

DETAILED DESCRIPTION OF THE INVENTION

Ink for Ink Jet Recording

The term "ink for ink jet recording" used herein refers to a black ink in the case of monochrome printing, and, in the case of color printing, color inks, specifically a yellow ink, a magenta ink, and a cyan ink, and, in some cases, a black ink.

The ink for ink jet recording to be used in the present invention comprises at least a water-soluble colorant, a water-soluble organic solvent, water, and a compound represented by the formula (I), (II), or (III).

Compound represented by the formula (I), (II), or (III)

The ink composition comprising a compound represented by the formula (I), (II), or (III) according to the present invention can realize a good image, which has high drying speed and no significant feathering, on various recording media, especially on plain papers, particularly even on recycled papers. The compound represented by the formula (I), (II), or (III) appears to function as a surfactant in the ink composition. It is considered that the addition of these compounds permits the penetrabiltiy of the ink composition into the recording medium to be brought to a proper range for providing good drying speed and preventing the creation of feathering. Further, the addition of the above compounds can offer an additional advantage that ink jet recording can be stably carried out.

In the formula (I), $R^{11}$, $R^{12}$, $R^{13}$, and $R^{14}$ each independently represent a $C_{1-6}$ alkyl group, preferably a $C_{1-4}$ alkyl group. This alkyl group may be either a straight chain or a branched chain.

A and a each independently represent an ethyleneoxy group and/or a propyleneoxy group, provided that one of A and B contains at least one propyleneoxy group. The total number of ethyleneoxy groups and propyleneoxy groups is preferably 2 to 60, more preferably 4 to 10.

The number of carbon atoms of the alkyl group represented by $R^{11}$, $R^{12}$, $R^{13}$, and $R^{14}$, a combination of the alkyl group and the number of carbon atoms, the structure and a combination of A and B, and the total number of ethyleneoxy groups and propyleneoxy groups may be properly determined by taking into consideration the HLB value of the compound represented by the formula (I).

According to a preferred embodiment of the present invention, the HLB value of the compound represented by the formula (I) is preferably not less than 7. Compounds, represented by the formula (I), that can provide such HLB values include:

compounds wherein $R^{11}$ represents t-butyl, $R^{12}$ represents methyl, $R^{13}$ represents t-butyl, $R^{14}$ represents methyl, A represents —(CH$_2$—CH$_2$—O)j—(CH$_2$—CH(CH$_3$)—O)k—, B represents —(CH$_2$—CH$_2$—O)j—(CH$_2$—CH(CH$_3$)—O)k— where J=10 and k=2;

compounds wherein $R^{11}$ represents ethyl, $R^{12}$ represents methyl, $R^{13}$ represents ethyl, $R^{14}$ represents methyl, A represents —(CH$_2$—CH(CH$_3$)—O)j—(CH$_2$—CH$_2$—O)k—, B represents —(CH$_2$—CH(CH$_3$)—O)j—(CH$_2$—CH$_2$—O)k— where j=1 and k=10; and compounds wherein $R^{11}$ represents isopropyl, $R^{12}$ represents ethyl, $R^{13}$ represents ispropyl, $R^{14}$ represents ethyl, A represents —(CH$_2$—CH$_2$—O)j—(C$_2$—CH(CH$_3$)—O)k—(CH$_2$—CH$_2$—O)l—, B represents —(CH$_2$—CH$_2$—O)j—(CH$_2$—CH(CH$_3$)—O)k—(CH$_2$—CH$_2$—O)l— where J=20, k=1, and l=4.

The use of a compound represented by the formula (I) has an advantage that foaming of the ink composition can be effectively prevented. The foaming of the ink composition leads to dropouts in ink jet recording, and hence should be preferably prevented. In particular, an ink composition containing an emulsion described below is often likely to foam. The addition of the compound represented by the formula (I) can effectively prevent foaming even in the ink composition containing an emulsion.

The amount of the compound represented by the formula (I) added in the ink for ink Jet recording according to the present invention is preferably about 0.1 to 10% by weight.

The ink for ink jet recording according to the present invention is soluble in water. Therefore, preferably, the surfactant used is soluble in water and has a high HLB value. In particular, the HLB value of the compound represented by the formula (I) is preferably not less than 7, particularly preferably not less than 9. When the HLB value of the compound represented by the formula (I) is low, it is preferred to additionally use other surfactant(s) or a water-soluble organic solvent.

In the formula (II), any one of $R^{21}$ and $R^{22}$ represents H with the other substituent representing CH$_3$ or H, and any one of $R^{23}$ and $R^{24}$ represents H with the other substituent representing CH$_3$ or H, provided that $R^{21}$, $R^{22}$, $R^{23}$, and $R^{24}$ do not simultaneously represent H; when any one of $R^{21}$ and $R^{22}$ represents H, both $R^{23}$ and $R^{24}$ represent H; and when both $R^{21}$ and $R^{22}$ represent H, at least one of $R^{23}$ and $R^{24}$ represents CH$_3$, and $R^{25}$ represents a $C_{4-10}$ alkyl group that may be of a straight-chain type or a branched type with the branched type being preferred.

In order to lower the viscosity of the ink, it is desired for m+n to satisfy $2 \leq m+n \leq 6$, preferably $2 \leq m+n \leq 3$.

Preferred examples of compounds represented by the formula (II) include:

compounds wherein $R^{21}$ represents hydrogen, $R^{22}$ represents methyl, $R^{23}$ represents hydrogen, $R^{24}$ represents methyl, $R^{25}$ represents butyl, and m+n is 3;

compounds wherein $R^{21}$ represents hydrogen, $R^{22}$ represents methyl, $R^{23}$ represents methyl, $R^{24}$ represents hydrogen, $R^{25}$ represents butyl, and m+n is 2; and compounds wherein $R^{21}$ represents methyl, $R^{22}$ represents hydrogen, $R^{23}$ represents methyl, $R^{24}$ represents hydrogen, $R^{25}$ represents butyl, and m+n is 6.

Use of the compound represented by the formula (II) can offer an advantage that the viscosity of the ink composition can be maintained at a low value. Maintaining the viscosity of the ink composition at a low value enables the amount of the colorant added to the ink composition to be increased. This can realize an image having a high print density.

In the ink for ink jet recording according to the present invention, the amount of the compound represented by the formula (II) is preferably in the range of 0.5 to 30% by weight.

In the formula (III), $R^{31}$ represents a $C_{4-10}$ alkyl group. This alkyl group may be either a straight chain or a branched chain. According to a preferred embodiment of the present invention, use of a compound represented by the formula (III), wherein $R^{31}$ represents an isobutyl or a t-butyl group, in the ink for ink jet recording is preferred.

As with the use of the compound represented by the formula (II), the use of the compound represented by the formula (III) enables the viscosity of the ink composition to be maintained at a low value, so that the amount of the colorant added can be increased.

The compound represented by the formula (III) often exhibits low water solubility. In this case, addition of a glycol ether, a nonionic surfactant, an amphoteric surfactant, or a mixture of two or more of them can improve the solubility of the compound represented by the formula (III) in the ink composition. In particular, addition of diethylene glycol mono-n-butyl ether, triethylene glycol mono-n-butyl ether is preferred.

In the ink for ink jet recording according to the present invention, the amount of the compound represented by the formula (III) added is preferably in the range of from 3 to 30% by weight.

Further, according to a preferred embodiment of the present invention, addition of a mixture of a plurality of compounds represented by the formula (III) to the ink composition is also preferred.

Water-soluble Colorant

The water-soluble colorant contained in the ink according to the present invention may be either a dye or a pigment.

Dyes usable herein include various dyes commonly used in ink jet recording, such as direct dyes, acid dyes, food dyes, basic dyes, reactive dyes, disperse dyes, vat dyes, soluble vat dyes, and reactive disperse dyes.

Inorganic pigments or organic pigments may be used without any particular limitation. Inorganic pigments usable herein include, in addition to titanium oxide and iron oxide, carbon blacks produced by known processes, such as contact, furnace, and thermal processes. Examples of the organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the pigment is dispersible and/or soluble in water without a dispersant. This pigment is one which has been surface treated so that at least one functional group, selected from carbonyl, carboxyl, hydroxyl, and sulfone groups, or a salt thereof is bonded to the surface of the pigment, thereby permitting the pigment to be dispersible and/or soluble in water without a dispersant. Specifically, this pigment can be prepared by grafting a functional group or a molecule containing a functional group onto the surface of carbon black by physical treatment, such as vacuum plasma, or chemical treatment. In the present invention, a single type or a plurality of types of functional groups may be grafted onto one carbon black particle.

The type of the functional group to be grafted and the degree of grafting may be suitably determined by taking the dispersion stability in the ink composition, the color density, the drying property at the front face of the ink jet head and the like into consideration.

In the present invention, when the pigment is stably present in water without any dispersant, this state is expressed as the state of "dispersion and/or dissolution." Not infrequently, it is difficult to distinguish the state of dissolution of a material from the state of dispersion of the material. In the present invention, any pigment can be used so far as the pigment is stably present in water without any dispersant independently of whether the pigment is in a dispersion form or a solution form. In the present specification, a pigment, which can stably exist in water without any dispersant is often referred to as a "water-soluble pigment." The water-soluble pigment in this case, however, does not exclude a pigment which is in the state of dispersion in water.

According to a preferred embodiment of the present invention, the pigment is used as a pigment dispersion having an average particle diameter of 50 to 200 nm and a degree of dispersion of not more than 10.

The pigment, which is preferably used in the present invention, may be prepared, for example, by a method disclosed in Japanese Patent Laid-Open No. 3498/1996. Further, the above pigment may be a commercially available one, and preferred examples thereof include microjet CW1 manufactured by Orient Chemical Industries, Ltd.

The amount of the pigment added to the ink composition is preferably 3 to 30% by weight, more preferably about 5 to 17% by weight.

Water-soluble Organic Solvent

Examples of the water-soluble organic solvent contained in the ink composition according to the present invention include: alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, and dipropylene glycol mono-n-butyl ether; formamide; acetamide; dimethyl sulfoxide; sorbit; sorbitan; acetin; diacetin; triacetin: and sulfolane.

The amount of the water-soluble organic solvent added to the ink composition is preferably 1 to 30% by weight, more preferably about 3 to 15% by weight Water and Other Ingredients In the ink composition according to the present invention, water serves as a main solvent. Water may be pure water, such as ion-exchanged water, water purified by ultrafiltration or reverse osmosis, or distilled water or ultrapure water. Further, use of water, which has been sterilized by ultraviolet irradiation, by addition of hydrogen peroxide, or by other methods, is preferred because, when the ink is stored for a long period of time, such water can prevent the occurrence of mold and bacteria.

According to a preferred embodiment of the present invention, addition of a water-soluble glycol to the ink is preferred. Preferred water-soluble glycols usable herein include, for example, ethylene glycol, diethylene glycol, triethylene glycol, propylene glycol, dipropylene glycol, tripropylene glycol, polyethylene glycol having a molecular weight of not more than 2000, 1,3-propylene glycol, isopropylene glycol, isobutylene glycol, 1,4-butanediol, 1,3-butanediol, 1,5-pentanediol, 1,6-hexanediol, mesoerythritol, and pentaerythritol. Water-soluble glycols function to prevent the ink from drying in the front face of nozzles.

The amount of the glycol added to the ink composition is preferably 1 to 30% by weight, more preferably about 3 to 15% by weight.

According to a preferred embodiment of the present invention, various saccharides may also be used in the ink. Preferred saccharides usable herein include monosaccharides and polysaccharides. More specific examples thereof include glucose, mannose, fructose, ribose, xylose, arabinose, lactose, galactose, aldonic acid, glucitose, maltose, cellobiose, sucrose, trehalose, maltotriose, alginic acid and salts thereof, cyclodextrins, and celluloses. The amount of the saccharide added to the ink is preferably about 0.05 to 30% by weight.

The addition of the saccharide can prevent a clogging phenomenon where the ink dries at the front end of the head and consequently clogs the head. In this connection, the amount of conventional saccharides, i.e., monosaccharides and polysaccharides, added to the ink is preferably about 3 to 20%. On the other hand, the amount of alginic acid and salts thereof, cyclodextrins, and celluloses added to the ink is preferably such that the low viscosity of the ink can be maintained permitting proper printing.

According to a preferred embodiment of the present invention, the ink composition may further comprise a surfactant. Preferred surfactants which may be added to the ink composition are those having good compatibility with other ingredients of the ink composition, and, among the surfactants, those having high penetrability and good stability are preferred. Preferred examples thereof include amphoteric surfactants and nonionic surfactants. Examples of amphoteric surfactants usable herein include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, and imidazoline derivatives. Examples of nonionic surfactants usable herein include ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether, polyoxyethyleneoleic acid, ester surfactants, such as polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate, and fluorosurfactants, such as fluoroalkyl esters and salts of perfluoroalkylcarboxylic acids. It is also possible to use acethylene glycol surfactants, and examples of acethylene glycol surfactants usable herein include Surfynol 465, TG, and 104 (manufactured by Air Products and Chemicals) and modification products thereof. Addition of the surfactant permits the penetrability of the ink composition to be further efficiently regulated. Further, this can offer an additional advantage that the water solubility of the compounds represented by the formulae (I), (II), and (III) can be improved.

The amount of the surfactant added to the ink composition is preferably 0.01 to 5% by weight, more preferably about 0.1 to 3% by weight.

According to a preferred embodiment of the present invention, when the water-soluble colorant is a pigment, the ink may further comprise an emulsion. Addition of the emulsion can improve the fixation and rubbing/scratch resistance of the resultant print. Preferably, the emulsion comprises a continuous phase of water and a dispersed phase of acrylic resin, methacrylic resin, styrene resin, urethane resin, acrylamide resin, or epoxy resin or a mixture of these resins. Particularly preferred is an emulsion wherein the dispersed phase comprises a resin composed mainly of acrylic acid and/or methacrylic acid. The resin is not limited by polymerization methods and may be, for example, a block copolymer, a random copolymer or the like. Further, preferably, the emulsion used in the ink composition of the present invention has a film forming property and has a lowest possible film forming temperature of preferably room temperature or below, more preferably 0 to 20° C.

According to a preferred embodiment of the present invention, the resin component of the emulsion is a resin particle having a core/shell structure comprising a core surrounded by a shell. For example, the resin particle may be constructed so that a resin component capable of improving the drying to the touch and the fixation of the ink is incorporated into the core and a resin component, which permits resin particles to stably exist in the ink composition, is incorporated into the shell. According to a preferred embodiment of the present invention, the shell comprises a resin having either a crosslinked structure or a structure with the number of benzene nuclei being larger than that in the structure of the core.

Materials for the shell usable herein include styrene, tetrahydrofurfuryl acrylate and butyl methacrylate, (α, 2, 3, or 4)-alkylstyrene, (α, 2, 3, or 4)-alkoxystyrene, 3,4-dimethylstyrene, α-phenhylstyrene, divinylbenzene, vinylnaphthalene, dimethylamino (meth)acrylate, dimethylaminoethyl (meth)acrylate, dimethylaminopropylacrylamide, N,N-dimethylaminoethyl acrylate, acryloylmorpholine, N,N-dimethylacrylamide, N-isopropylacrylamide, N,N-diethylacrylamide, methyl (meth)acrylate, ethyl (meth)acrylate, propyl (meth)acrylate, ethylhexyl (meth)acrylate, and other alkyl (meth)acrylates, methoxydiethylene glycol (meth)acrylate, (meth)acrylate of an ethyl, propyl, or butyl ester of diethylene glycol or polyethylene glycol, cyclohexyl (meth)acrylate, benzyl (meth)acrylate, phenoxyethyl (meth)acrylate, isobornyl (meth)acrylate, hydroxyalkyl (meth)acrylate, fluorine-, chlorine-, or silicon-containing (meth)acrylate, (meth)acrylamide, and maleic amide.

When a crosslinked structure is introduced in addition to the above (meth)acrylic acid, it is possible to use (mono, di, tri, tetra, or poly)ethylene glycol di(meth)acrylate, (meth)acrylates of 1,4-butanediol, 1,5-pentanediol, 1,6-hexanediol, 1,8-octanediol, and 1,10-decanediol, trimethylolpropane tri (meth)acrylate, glycerin (di or tri)(meth)acrylate, di(meth)acrylate of ethylene oxide adduct of bisphenol A or F, neopentyl glycol di(meth)acrylate, pentaerythritol tetra (meth)acrylate, and dipentaerythritol hexa(meth)acrylate.

For the formation of the core, the same material as used in the formation of the shell may be used.

Emulsifiers usable for the formation of the above polymeric fine particles include sodium laurylsulfate, potassium laurylsulfate, anionic surfactants, nonionic surfactants, and amphoteric surfactants, which are commonly used in the art.

Polymerization initiators usable herein include potassium persulfate, ammonium persulfate, hydrogen persulfate, azobisisobutyronitrile, benzoyl peroxide, dibutyl peroxide, peracetic acid, cumene hydroperoxide, t-butyl hydroxyperoxide, and p-menthane hydroxyperoxide.

Chain transfer agents usable for the polymerization include t-dodecylmercaptan, n-dodecylmercaptan, n-octylmercaptan, xanthogen compound, such as dimethylxanthogendisulfide or diisobutylxanthogendisulfide, dipentene, indene, 1,4-cyclohexadiene, dihydrofuran, and xanthen.

According to a preferred embodiment of the present invention, the molecular weight of the emulsion is preferably not less than 1000, more preferably about 10,000 to 100,000.

The emulsion used In the present invention may be a commercially available one, and examples thereof include Z116 manufactured by Mitsui Toatsu Chemicals, Inc.

The amount of the water-soluble emulsion added may be properly determined. For example, it is preferably about 0.5 to 10% by weight, more preferably about 3 to 5% by weight.

The ink composition of the present invention may contain, in addition to the above ingredients, other ingredients. Examples of other ingredients usable herein include preservatives, antioxidants, electric conductivity adjustors, pH adjustors, viscosity modifiers, surface tension modifiers, oxygen absorbers, and nozzle clogging preventives.

Preservatives and fungicides usable herein include, for example, sodium benzoate, pentachlorophenol sodium, 2-pyridinethiol-1-oxide sodium, sodium sorbate, sodium dehydroacetate, 1,2 dibenzothiazoline-3-one (Proxel CRL, Proxel BDN, Proxel GXL, Proxel XL-2, and Proxel TN, manufactured by ICI).

pH adjustors, solubilizers, and antioxidants usable herein include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanate compounds, such as allophanate and methyl allophanate; biuret compounds, such as biuret, dimethylbiuret, and tetramethylbiuret; and L-ascorbic acid and salts thereof.

Antioxidants and ultraviolet absorbers, which may be added to the ink, include Tinuvin 328, 900, 1130, 384, 292, 123, 144, 622, 770, and 292, Irgacor 252 and 153, and Irganox 1010, 1076, 1035, and MD1024, manufactured by Ciba-Geigy, and lanthanide oxides.

Viscosity modifiers usable herein include rosin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic, and starch.

Ink Jet Recording Method and Apparatus

The ink jet recording method used in the ink composition according to the present invention refers to a recording method wherein a droplet of an ink composition is ejected and deposited onto a recording medium to perform printing. Examples of such ink jet recording methods include, for example, a method wherein an electric signal is converted to a mechanical signal using an electrostrictive element to intermittently eject an ink reservoired in a nozzle head section, thereby recording letters or symbols on the surface of a recording medium, and a method wherein an ink, reservoired in a nozzle head section, in its portion very close to the ejection portion is rapidly heated to create a bubble and the ink in intermittently ejected by volume expansion created by the bubble to record letters or symbols on the surface of a recording medium. According to a preferred embodiment of the present invention, the ink of the present invention is used in ink jet recording using an electrostrictive element. This is because methods involving heating of the head section cause the colorant and other ingredients contained in the ink to be decomposed, clogging the head.

An ink, comprising a pigment as the colorant, having a relatively high content of a solid, like the ink of the present invention, when placed in a nozzle without ejection for a long period of time, is likely to dry at the front face of the nozzle to cause thickening, leading to an ink droplet trajectory directionality problem. In this case, slightly moving the ink with care not to cause the ink to be delivered from the front face of the nozzle can stir the ink, permitting the ink to be stably ejected. This can be achieved by pressurizing the ink, by means of pressurizing means for ejecting the ink, with care not to cause the ink to be ejected. In the above regulation, use of an electrostrictive element as the pressurizing means is preferred from the viewpoint of easy regulation. Utilization of this mechanism can increase the content of the pigment in the ink, permitting a high color density to be provided using a pigment-based ink and, in addition, the ink to be stably ejected.

When the above slight moving of the ink is carried out in the nozzle face of an ink jet recording apparatus, this operation is effective for an ink composition having a pigment content of about 5 to 15% by weight, more preferably about 7 to 10% by weight.

In use, the ink composition of the present invention may be filled into an ink tank constructed so that a polyurethane foam is provided therein and the ink comes into contact with the polyurethane foam. In this case, the glycol ether compound, which is preferably used in the present invention, and the acetylene glycol surfactant used in the present invention are adsorbed onto the polyurethane foam. Therefore, preferably, they are added in an excessive amount in consideration of the adsorption. Further, the polyurethane foam can ensure a negative pressure by using the ink composition of the present invention and is less likely to be decomposed by ingredients of the ink used in the present invention, or to create a deposit causative of clogging of the nozzle. A polyurethane foam not using a curing catalyst containing a metal salt or a cationic material is preferred. Specifically, use of a polyurethane foam comprising a polyfunctional isocyanate, such as tolylene diisocyanate or m-xylene diisocyanate, and a material having a plurality of hydroxyl groups, such as a glycol compound having an average molecular weight of about 300 to 3000, such as polypropylene glycol or polyethylene glycol, glycerin, pentaerythritol, dipentaerythritol, neopentyl glycol, propylene glycol, 1,3-butanediol, 1,4-butanediol, or 1,5-pentanediol, is preferred from the viewpoint of ensuring negative pressure, by virtue of the stability of foam shape, and chemical stability.

When the acetylene glycol surfactant is utilized, a part of the acetylene glycol surfactant is adsorbed onto the polyurethane foam. Therefore, when the acetylene glycol surfactant is added to the ink composition, the composition of the ink should be determined by taking into consideration the amount of the acetylene glycol surfactant adsorbed onto the urethane foam.

According to a preferred embodiment of the present invention, the ink composition of the present invention is printed by ejecting a droplet of the ink composition through a nozzle the front end (head) of which has a water-repellent surface. More specifically, the front end of the nozzle preferably has a structure produced by providing a stainless steel mater as a base material, applying an eutectoid plating of tetrafluoroethylene and nickel on the base, and heat-treating the plating to form a water-repellent layer. In addition, utilization of an eutectoid plating of tetrafluoroethylene and a highly non-oxidizable metal, such as chromium, titanium, gold, platinum, silver, or iridium, instead of nickel is also preferred. A combination of the ink composition according to the present invention with the above nozzle enables continuous printing to be stably performed for a long period of time.

According to a more preferred embodiment of the present invention, the contact angle of the ink composition on the water-repellent surface at the front end of the nozzle is 50° or above at a general operation temperature of the printer (for example, 15 to 60° C.). According to this embodiment, improved print quality and continuous printing can be realized.

EXAMPLES

The present invention will be described in more detail with reference to the following examples though it is not limited to these examples only.

Preparation of Ink Compositions

Water-soluble pigments 1 to 4 used in the following examples are water-soluble pigments each having on its surface a group terminated with a carbonyl, carboxyl, hydroxyl, sulfone or other group. These pigments were prepared by applying a method described in Japanese Patent Laid-Open No. 34981/1996 to a carbon black having a particle diameter of 10 to 300 nm and a degree of dispersion of not more than 10. The water-soluble pigments had an average particle diameter as indicated in parentheses (unit: nm).

Further, water-soluble dyes used in the following examples are represented by the following general formula (IV) and (V):

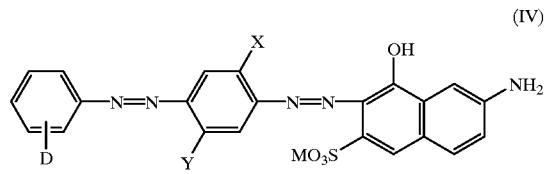

(IV)

wherein

D represents $PO(OM)_2$ or $COOM$,

X and Y each independently represents an alkoxy or alkyl group, and

M represents an alkali metal, H, $NH_4$, or an organic amine; and

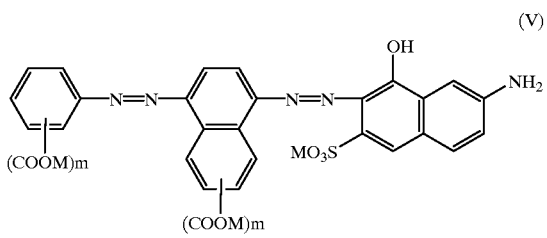

(V)

wherein

M represents an alkali metal, H, $NH_4$, or an organic amine, m is an integer of 1 or 2, and n is an integer of 0 or 1.

Abbreviations used in the following description are as follows.

DEGmBE: diethylene glycol mono-n-butyl ether
DMI: 1, 3-dimethyl-2-imidazolidinone
PGmBE: propylene glycol mono-n-butyl ether
MPD: 2-methyl-2,4-pentanediol
DPGmBE: dipropylene glycol mono-n-butyl ether
TEGmBE: triethylene glycol mono-n-butyl ether Further, in the following description, the term "emulsion" refers to a resin emulsion comprising fine particles of a polymer dispersed in water, and the emulsion was prepared as follows.

Ion-exchanged water (100 parts) was placed in a reactor equipped with a dropping device, a thermometer, a water cooling type reflux condenser, and an agitator. Potassium persulfate (0.2 part) as a polymerization initiator was added thereto at 70° C. in a nitrogen atmosphere while stirring. Thereafter, a monomer solution prepared by dissolving 0.05 part of sodium laurylsulfate, 10 parts of styrene, 2 parts of tetrahydrofurfuryl acrylate, 5 parts of butyl methacrylate, and 0.02 part of t-dodecylmercaptan in 7 parts of ion-exchanged water was added dropwise thereto at 70° C. to conduct a reaction, thereby preparing a primary compound. A 10% solution of ammonium persulfate (2 parts) was added to the primary compound with stirring. Further, a reaction solution composed of 30 parts of ion-exchanged water, 10 parts of diethylene glycol monobutyl ether, 0.2 part of potassium laurylsulfate, 30 parts of styrene, 15 parts of butyl methacrylate, 16 parts of butyl acrylate, 3 parts of acrylic acid, 1 part of 1,6-hexanediol dimethacrylate, and 0.5 part of t-dodecylmercaptan was added to the mixture at 70° C. with stirring to conduct polymerization. The reaction mixture was then neutralized and adjusted to pH 8–8.5 by addition of ammonia and filtered through a 0.3 μm filter, thereby preparing a dispersion of fine particles of a polymer in water as an emulsion.

Into all the following ink compositions were added 0.1 to 1% by weight of Proxel XL-2 as a corrosion preventive for inks and 0.001 to 0.05% by weight of benzotriazole as a corrosion preventive for an ink jet head member.

Example A

| Example A1 | Amount (wt %) |
| --- | --- |
| Water-soluble pigment 1 (105) | 5.0 |
| Compound 1 of the formula (I) | 1.0 |
| Emulsion | 3.0 |
| DEGmBE | 7.0 |
| Glycerin | 6.0 |
| 1,5-Pentanediol | 5.0 |
| Triethanolamine | 0.8 |
| Ion-exchanged water | Balance |

Compound 1 of the formula (I) is a compound wherein $R^{11}$ and $R^{12}$ represent a methyl group, $R^{13}$ and $R^{14}$ represent an isobutyl group, and A and B each represent a group consisting of propylene oxide and ethylene oxide wherein the average number of units of the propylene oxide group is 4, the average number of units of the ethylene oxide group is 6, and the average total number of units of the ethylene oxide group and units of the propylene oxide group is 10.

| Example A2 | Amount (wt %) |
| --- | --- |
| Water-soluble pigment 2 (85) | 3.0 |
| Compound 2 of the formula (I) | 1.2 |
| Emulsion | 1.0 |
| DEGmBE | 10.0 |
| Dipropylene glycol | 5.0 |

-continued

| Example A2 | Amount (wt %) |
| --- | --- |
| Triethanolamine | 1.0 |
| Potassium hydroxide | 0.1 |
| Ion-exchanged water | Balance |

Compound 2 of the formula (I) is a compound wherein $R^{11}$ and $R^{12}$ represent an ethyl group, $R^{13}$ and $R^{14}$ represent a methyl group, and A and B each represent a group consisting of propylene oxide and ethylene oxide wherein the average number of units of the propylene oxide group is 2, the average number of units of the ethylene oxide group is 6, and the average total number of units of the ethylene oxide group and units of the propylene oxide group is 10.

| Example A3 | Amount (wt %) |
| --- | --- |
| Water-soluble pigment 3 (90) | 5.5 |
| Compound 3 of the formula (I) | 1.4 |
| Emulsion | 10.0 |
| Propylene glycol | 7.0 |
| Triethylene glycol | 3.0 |
| Ion-exchanged water | Balance |

Compound 3 of the formula (I) is a compound wherein $R^{11}$, $R^{12}$, $R^{13}$, and $R^{14}$ represent a methyl group, and A and B each represent a group consisting of propylene oxide and ethylene oxide wherein the average number of units of the propylene oxide group is 4, the average number of units of the ethylene oxide group is 10, and the average total number of units of the ethylene oxide group and units of the propylene oxide group is 14.

| Example A4 | Amount (wt %) |
| --- | --- |
| Water-soluble pigment 4 (80) | 5.0 |
| Compound 4 of the formula (I) | 0.8 |
| Emulsion | 3.0 |
| 1,6-Hexanediol | 5.0 |
| Tripropylene glycol | 2.0 |
| DMI | 2.0 |
| Sodium benzoate | 0.1 |
| Ion-exchanged water | Balance |

Compound 4 of the formula (I) is a compound wherein $R^{11}$ and $R^{12}$ represent a methyl group, $R^{13}$ and $R^{14}$ represent an isopropyl group, and A and B each represent a group consisting of propylene oxide and ethylene oxide wherein the average number of units of the propylene oxide group is 3, the average number of units of the ethylene oxide group is 9, and the average total number of units of the ethylene oxide group and units of the propylene oxide group is 12.

| Example A5 | Amount (wt %) |
| --- | --- |
| Water-soluble pigment 1 | 3.0 |
| Water-soluble dye A1 | 1.0 |
| Compound 5 of the formula (I) | 1.2 |
| Emulsion | 3.5 |
| PGmBE | 2.0 |
| MPD | 3.0 |
| 1,5-Pentanediol | 3.0 |

-continued

| Example A5 | Amount (wt %) |
| --- | --- |
| Triethanolamine | 0.9 |
| Ion-exchanged water | Balance |

Compound 5 of the formula (I) is a compound wherein $R^{11}$ and $R^{12}$ represent a methyl group, $R^{13}$ and $R^{14}$ represent an isobutyl group, and A and B each represent a group consisting of propylene oxide and ethylene oxide wherein the average number of units of the propylene oxide group is 4, the average number of units of the ethylene oxide group is 12, and the average total number of units of the ethylene oxide group and units of the propylene oxide group is 16. The water-soluble dye A1 is a compound represented by the formula (IV), wherein A represents COOK, X and Y represent a methyl group, and M represents potassium.

| Example A6 | Amount (wt %) |
| --- | --- |
| Water-soluble dye A2 | 5.0 |
| Compound 6 of the formula (I) | 0.5 |
| Emulsion | 4.0 |
| DPGmBE | 2.0 |
| DEGmBE | 10.0 |
| Neopentyl glycol | 5.0 |
| Ion-exchanged water | Balance |

Compound 6 of the formula (I) is a compound wherein $R^{11}$ and $R^{12}$ represent a methyl group, $R^{13}$ and $R^{14}$ represent an n-propyl group, and A and B each represent a group consisting of propylene oxide and ethylene oxide wherein the average number of units of the propylene oxide group is 2, the average number of units of the ethylene oxide group is 4, and the average total number of units of the ethylene oxide group and units of the propylene oxide group is 6. The water-soluble dye A2 is a compound represented by the formula (V), wherein m is 1, n is 1, and M represents potassium.

| Example A7 | Amount (wt %) |
| --- | --- |
| Direct Blue 86 | 5.0 |
| Compound 7 of the formula (I) | 1.6 |
| Emulsion | 5.0 |
| TEGmBE | 10.0 |
| Glycerin | 5.0 |
| Trimethylolpropane | 5.0 |
| Triethanolamine | 0.1 |
| Ion-exchanged water | Balance |

Compound 7 of the formula (I) is a compound wherein $R^{11}$ and $R^{12}$ represent a methyl group, $R^{13}$ and $R^{14}$ represent an isobutyl group, and A and B each represent a group consisting of propylene oxide and ethylene oxide wherein the average number of units of the propylene oxide group is 10, the average number of units of the ethylene oxide group is 40, and the average total number of units of the ethylene oxide group and units of the propylene oxide group is 50.

| Example A8 | Amount (wt %) |
|---|---|
| Acid Red 52 | 5.5 |
| Compound 8 of the formula (I) | 1.0 |
| Emulsion | 5.0 |
| DPGmBE | 5.0 |
| DEGmBE | 5.0 |
| Diethylene glycol | 5.0 |
| Sodium dodecylbenzenesulfonate | 0.2 |
| Ion-exchanged water | Balance |

Compound 8 of the formula (I) is a compound wherein $R^{11}$ and $R^{12}$ represent a methyl group, $R^{13}$ and $R^{14}$ represent an isobutyl group, and A and B each represent a group consisting of propylene oxide and ethylene oxide wherein the average number of units of the propylene oxide group is 1, the average number of units of the ethylene oxide group is 1, and the average total number of units of the ethylene oxide group and units of the propylene oxide group is 2.

Comparative Example A

In the following comparative examples, the term "pigment dispersion" refers to a carbon black which has been dispersed with the aid of a styrene/acrylic acid random copolymer as a dispersant, and the average particle diameter thereof was as indicated in parentheses (unit: nm).

| | Amount (wt %) |
|---|---|
| Comparative Example A1 | |
| Pigment dispersion (90) | 5.0 |
| Dispersant | 3.0 |
| Nonionic surfactant | 0.8 |
| 2-Pyrrolidone | 3.0 |
| Polyethylene glycol 1000 | 4.0 |
| Ion-exchanged water | Balance |
| Comparative Example A2 | |
| Food Black 2 | 5.5 |
| Glycerin | 10.0 |
| Ethyl carbitol | 10.0 |
| 2-Pyrrolidone | 5.0 |
| Ion-exchanged water | Balance |
| Comparative Example A3 | |
| Pigment dispersion (110) | 5.5 |
| Water-soluble dye (Food Black 2) | 2.5 |
| Diethylene glycol | 10.0 |
| Nonionic surfactant | 1.0 |
| Ion-exchanged water | Balance |

Print Quality Test

Characters were printed using the ink compositions prepared in the examples and the comparative examples by means of an ink jet printer MJ-930C (manufactured by Seiko Epson Corp.). Papels used for the evaluation were Conqueror, Favorit, Modo Copy, Rapid Copy, EPSON EPP, Xerox 4024, Xerox 10, Neenha Bond, Ricopy 6200, Yamayuri, and Xerox R papers that are plain papers commercially available in Europe, America, and Japan.

The prints were evaluated as follows. Assuming that 10 to 50 mg of a spherical ink droplet was spread in a circular form on the surface of paper, the radius of an circumscribed circle, $r_2$, to the radius of an inscribed circle, $r_1$, that is, $r_2/r_1$, in the formed ink dot was determined. The results were evaluated according to the following criteria.

A: $r_2/r_1 \leq 2.0$
B: $2.0 < r_2/r_1 \leq 4.0$
C: $4.0 < r_2/r_1 \leq 6.0$
D: $6.0 < r_2/r_1$ The results of evaluation were as summarized in the following table.

TABLE 1

Results of evaluation on print quality

| | Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| Conqueror | A | A | A | A | A | A | A | A | C | C | C |
| Favorit | A | A | A | A | A | A | A | A | D | D | D |
| Modo Copy | A | A | A | A | A | A | A | A | C | D | D |
| Rapid Copy | A | A | A | A | A | A | A | A | C | D | D |
| EPSON EPP | A | A | A | A | A | A | A | A | C | C | D |
| Xerox P | A | A | A | A | A | A | A | A | C | D | D |
| Xerox 4024 | A | A | A | A | A | A | A | A | C | D | D |
| Xerox 10 | A | A | A | A | A | A | A | A | B | D | D |
| Neenha Bond | A | A | A | A | A | A | A | A | D | D | D |
| Ricopy 6200 | A | A | A | A | A | A | A | A | B | C | D |
| Yamayuri | A | A | A | A | A | A | A | A | D | D | D |
| Xerox R | A | A | A | A | A | A | A | A | C | D | D |

Example B

| Example B1 | Amount (wt %) |
|---|---|
| Water-soluble pigment 1 (105) | 5.0 |
| Compound 1 of the formula (II) | 8.0 |
| Emulsion | 3.0 |
| Glycerin | 6.0 |
| 1,5-Pentanediol | 5.0 |
| Triethanolamine | 0.8 |
| Ion-exchanged water | Balance |

Compound 1 of the formula (II) is a compound wherein both $R^{21}$ and $R^{22}$ represent H, one of $R^{23}$ and $R^{24}$ represents a methyl group with the other substituent representing H, $R^{25}$ represents butyl, and m+n is 2.

| Example B2 | Amount (wt %) |
|---|---|
| Water-soluble pigment 2 (85) | 4.5 |
| Compound 2 of the formula (II) | 10.0 |
| Emulsion | 3.0 |
| Dipropylene glycol | 5.0 |
| Surfynol 465 | 1.2 |
| Triethanolamine | 0.1 |
| Ion-exchanged water | Balance |

Compound 2 of the formula (II) is a compound wherein one of $R^{21}$ and $R^{22}$ represents a methyl group with the other substituent representing H, both $R^{23}$ and $R^{24}$ represent H, $R^{25}$ represents butyl, and m+n is 2.

| Example B3 | Amount (wt %) |
|---|---|
| Water-soluble pigment 3 (90) | 5.5 |
| Compound 3 of the formula (II) | 10.0 |

| Example B3 | Amount (wt %) |
| --- | --- |
| Emulsion | 10.0 |
| Propylene glycol | 7.0 |
| Triethylene glycol | 3.0 |
| 1,6-Hexanediol | 5.0 |
| Potassium hydroxide | 0.1 |
| Ion-exchanged water | Balance |

Compound 3 of the formula (II) is a mixture of a compound wherein both $R^{21}$ and $R^{22}$ represent H, and one of $R^{23}$ and $R^{24}$ represents a methyl group with the other substituent representing H, $R^{25}$ represents butyl, with a compound wherein one of $R^{21}$ and $R^{22}$ represents a methyl group with the other substituent representing H, and $R^{23}$ and $R^{24}$ represent H, $R^{25}$ represents butyl, provided that the average of m+n is 2.

| Example B4 | Amount (wt %) |
| --- | --- |
| Water-soluble pigment 4 (80) | 5.0 |
| Water-soluble dye B1 | 1.0 |
| Compound 4 of the formula (II) | 8.0 |
| Emulsion | 1.0 |
| Tripropylene glycol | 2.0 |
| Dimethyl-2-imidazolidinone | 2.0 |
| Sodium benzoate | 0.1 |
| Ion-exchanged water | Balance |

Compound 4 of the formula (II) is a mixture of a compound wherein both $R^{21}$ and $R^{22}$ represent H, one of $R^{23}$ and $R^{24}$ represents a methyl group with the other substituent representing H, $R^{25}$ represents butyl, with a compound wherein one of $R^{21}$ and $R^{22}$ represents a methyl group with the other substituent representing H and both $R^{23}$ and $R^{24}$ represent H, $R^{25}$ represents butyl, provided that the average of m+n is 3. The water-soluble dye B1 is a compound represented by the formula (IV), wherein A represents COOK, X and Y represent a methyl group, and M represents potassium.

| Example B5 | Amount (wt %) |
| --- | --- |
| Water-soluble pigment 1 (105) | 3.0 |
| Water-soluble dye B2 | 1.0 |
| Compound 5 of the formula (II) | 7.0 |
| Emulsion | 1.0 |
| Triethanolamine | 0.9 |
| Ion-exchanged water | Balance |

Compound 5 of the formula (II) is a mixture of a compound wherein both $R^{21}$ and $R^{22}$ represent H, one of $R^{23}$ and $R^{24}$ represents a methyl group with the other substituent representing H, $R^{25}$ represents butyl, with a compound wherein one of $R^{21}$ and $R^{22}$ represents a methyl group with the other substituent representing H and both $R^{23}$ and $R^{24}$ represent H, $R^{25}$ represents butyl, provided that the average of m+n is 4. The water-soluble dye B2 is a compound represented by the formula (IV), wherein A represents COONa, X and Y represent a methyl group, and M represents sodium.

| Example B6 | Amount (wt %) |
| --- | --- |
| Water-soluble dye 2 | 5.0 |
| Compound 6 of the formula (II) | 6.0 |
| Glycerin | 15.0 |
| Triethanolamine | 0.9 |
| Ion-exchanged water | Balance |

Compound 6 of the formula (II) is a mixture of a compound wherein both $R^{21}$ and $R^{22}$ represent H, one of $R^{23}$ and $R^{24}$ represents a methyl group with the other substituent representing H, $R^{25}$ represents butyl, with a compound wherein one of $R^{21}$ and $R^{22}$ represents a methyl group with the other substituent representing H and both $R^{23}$ and $R^{24}$ represent H, $R^{25}$ represents butyl, provided that the average of m+n is 2.5. The water-soluble dye 2 is a compound represented by the formula (V), wherein m is 1, n is 1, and M represents potassium.

| Example B7 | Amount (wt %) |
| --- | --- |
| Direct Blue 86 | 5.0 |
| Compound 7 of the formula (II) | 10.0 |
| Glycerin | 5.0 |
| Trimethylolpropane | 5.0 |
| Trimethylolethane | 5.0 |
| Surfynol 465 | 1.0 |
| Triethanolamine | 0.1 |
| Ion-exchanged water | Balance |

Compound 7 of the formula (II) is a mixture of a compound wherein both $R^{21}$ and $R^{22}$ represent H, and one of $R^{23}$ and $R^{24}$ represents a methyl group with the other substituent representing H, $R^{25}$ represents butyl, with a compound wherein one of $R^{21}$ and $R^{22}$ represents a methyl group with the other substituent representing H, and both $R^{23}$ and $R^{24}$ represent H, $R^{25}$ represents butyl, provided that the average of m+n is 6.

| Example B8 | Amount (wt %) |
| --- | --- |
| Acid Red 52 | 5.5 |
| Compound 8 of the formula (II) | 6.0 |
| Diethylene glycol | 5.0 |
| Tetrapropylene glycol | 5.0 |
| Ion exchanged water | Balance |

Compound 8 of the formula (II) is a compound wherein both $R^{21}$ and $R^{22}$ represent H, one of $R^{23}$ and $R^{24}$ represents a methyl group with the other substituent representing H, $R^{25}$ represents butyl, and m+n is 3.

Comparative Example B

In the following comparative examples, the term "pigment dispersion" refers to a carbon black which has been dispersed with the aid of a styrene/acrylic acid random copolymer as a dispersant, and the average particle diameter thereof was as indicated in parentheses (unit: nm).

| | Amount (wt %) |
|---|---|
| Comparative Example B1 | |
| Pigment dispersion (90) | 5.0 |
| Glycerin | 10.0 |
| Dispersant | 3.0 |
| Nonionic surfactant | 1.0 |
| Ion-exchanged water | Balance |
| Comparative Example B2 | |
| Food Black 2 | 5.5 |
| DEGmME | 7.0 |
| Diethylene glycol | 10.0 |
| 2-Pyrrolidone | 5.0 |
| Ion-exchanged water | Balance |
| Comparative Example B3 | |
| Water-soluble pigment 11 (110) | 5.5 |
| Food Black 2 | 2.5 |
| Diethylene glycol | 10.0 |
| Nonionic surfactant | 1.0 |
| Ion-exchanged water | Balance |

Print Quality Test

For the ink compositions prepared in Examples B1 to B8 and Comparative Examples B1 to B3, prints were prepared and evaluated for feathering in the same manner as described above in connection with the ink composition prepared in Examples A1 to A8 and Comparative Examples A1 to A3. The results were as summarized in the following table.

TABLE 2

Results of evaluation on print quality

| | Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| Conqueror | A | A | A | A | A | A | A | A | C | C | C |
| Favorit | A | A | A | A | A | A | A | A | D | D | D |
| Modo Copy | A | A | A | A | A | A | A | A | C | D | D |
| Rapid Copy | A | A | A | A | A | A | A | A | C | D | D |
| EPSON EPP | A | A | A | A | A | A | A | A | C | C | D |
| Xerox P | A | A | A | A | A | A | A | A | C | D | D |
| Xerox 4024 | A | A | A | A | A | A | A | A | C | D | D |
| Xerox 10 | A | A | A | A | A | A | A | A | B | D | D |
| Neenha Bond | A | A | A | A | A | A | A | A | C | D | D |
| Ricopy 6200 | A | A | A | A | A | A | A | A | B | C | D |
| Yamayuri | A | A | A | A | A | A | A | A | D | D | D |
| Xerox R | A | A | A | A | A | A | A | A | C | D | D |

Example C

| Example C1 | Amount (wt %) |
|---|---|
| Water-soluble pigment 1 (105) | 5.0 |
| Compound 1 of the formula (III) | 8.0 |
| DEGmBE | 2.0 |
| Emulsion | 3.0 |
| Glycerin | 6.0 |
| 1,5-Pentanediol | 5.0 |
| Triethanolamine | 0.8 |
| Ion-exchanged water | Balance |

Compound 1 of the formula (III) is a compound wherein $R^{31}$ represents a neopentyl group and p is 3.

| Example C2 | Amount (wt %) |
|---|---|
| Water-soluble pigment 2 (85) | 4.5 |
| Compound 2 of the formula (III) | 10.0 |
| Emulsion | 3.0 |
| Dipropylene glycol | 5.0 |
| Surfynol 465 | 1.2 |
| Triethanolamine | 0.9 |
| Ion-exchanged water | Balance |

Compound 2 of the formula (III) is a compound wherein $R^{31}$ represents a t-butyl group and p is 3.

| Example C3 | Amount (wt %) |
|---|---|
| Water-soluble pigment 3 (90) | 5.5 |
| Compound 3 of the formula (III) | 10.0 |
| Emulsion | 10.0 |
| Diethylene glycol | 7.0 |
| Thiodiglycol | 3.5 |
| 1,6-Hexanediol | 5.0 |
| Triethanolamine | 1.0 |
| Potassium hydroxide | 0.1 |
| Ion-exchanged water | Balance |

Compound 3 of the formula (III) is a compound wherein $R^{31}$ represents an n-hexyl group and p is 3.

| Example C4 | Amount (wt %) |
|---|---|
| Water-soluble pigment 4 (80) | 5.0 |
| Water-soluble dye C1 | 1.0 |
| Compound 4 of the formula (III) | 8.0 |
| TEGmBE | 3.0 |
| Emulsion | 1.0 |
| Diethylene glycol | 3.0 |
| 1,5-Pentanediol | 2.0 |
| Dimethyl-2-imidazolidinone | 2.0 |
| Sodium benzoate | 0.1 |
| Triethanolamine | 0.7 |
| Ion-exchanged water | Balance |

Compound 4 of the formula (III) is a compound wherein $R^{31}$ represents an isobutyl group and p is 3. The water-soluble dye C1 is a compound of the formula (IV) wherein A represents COOK, X and Y represent a methyl group, and M represents potassium.

| Example C5 | Amount (wt %) |
|---|---|
| Water-soluble pigment 1 (105) | 3.0 |
| Water-soluble dye C2 | 1.0 |
| Compound 5 of the formula (III) | 7.0 |
| DEGmBE | 2.0 |
| Emulsion | 1.0 |
| Glycerin | 14.0 |
| Triethanolamine | 0.9 |
| Ion-exchanged water | Balance |

Compound 5 of the formula (III) is a mixture of 50% of a compound wherein $R^{31}$ represents an n-hexyl group and p is 3, with 50% of a compound wherein $R^{31}$ represents an n-pentyl group and p is 3. The water-soluble dye C2 is a compound represented by the formula (IV), wherein A represents COONa, X and Y represent a methyl group, and M represents sodium.

| Example C6 | Amount (wt %) |
|---|---|
| Water-soluble dye 2 | 5.0 |
| Compound 6 of the formula (III) | 6.0 |
| TEGmBE | 4.0 |
| Glycerin | 15.0 |
| Thiodiglycol | 2.0 |
| 1,5-Pentanediol | 1.0 |
| Triethanolamine | 0.9 |
| Ion-exchanged water | Balance |

Compound 6 of the formula (III) is a compound wherein $R^{31}$ represents a 1,1-dimethylbutyl group and p is 3. The water-soluble dye 2 is a compound represented by the formula (V), wherein m is 1, n is 1, and M represents potassium.

| Example C7 | Amount (wt %) |
|---|---|
| Direct Yellow 132 | 5.0 |
| Compound 7 of the formula (III) | 10.0 |
| DEGmBE | 3.0 |
| Glycerin | 5.0 |
| Trimethylolpropane | 5.0 |
| Trimethylolethane | 5.0 |
| Surfynol 465 | 1.0 |
| Triethanolamine | 0.5 |
| KOH | 0.05 |
| Ion-exchanged water | Balance |

Compound 4 of the formula (III) is a mixture of 50% of a compound wherein $R^{31}$ represents a 1,3-dimethylbutyl group and p is 3, with 50% of a compound wherein $R^{31}$ represents a 1,2-dimethylbutyl group and p is 3.

| Example C8 | Amount (wt %) |
|---|---|
| Acid Blue 9 | 5.5 |
| Compound 8 of the formula (III) | 6.0 |
| Glycerin | 5.0 |
| Diethylene glycol | 5.0 |
| Tetrapropylene glycol | 5.0 |
| Triethanolamine | 0.9 |
| KOH | 0.1 |
| Ion-exchanged water | Balance |

Compound 8 of the formula (III) is a mixture of 50% of a compound wherein $R^{31}$ represents a neopentyl group and p is 3, with 30% of a compound wherein $R^{31}$ represents an n-pentyl group and p is 3 and 20% of a compound wherein $R^{31}$ represents an isopentyl group and p is 3.

Comparative Example C

In the following comparative examples, the term "pigment dispersion" refers to a carbon black which has been dispersed with the aid of a styrene/acrylic acid random copolymer as a dispersant, and the average particle diameter thereof was as indicated in parentheses (unit: nm).

| | Amount (wt %) |
|---|---|
| Comparative Example C1 | |
| Water-soluble pigment 9 (90) | 5.0 |
| Glycerin | 10.0 |
| Dispersant | 3.0 |
| Nonionic surfactant | 1.0 |
| Ion-exchanged water | Balance |
| Comparative Example C2 | |
| Food Black 2 | 5.5 |
| DEGmME | 7.0 |
| Diethylene glycol | 10.0 |
| 2-Pyrrolidone | 5.0 |
| Ion-exchanged water | Balance |
| Comparative Example C3 | |
| Water-soluble pigment 11 (110) | 5.5 |
| Food Black 2 | 2.5 |
| Diethylene glycol | 10.0 |
| Nonionic surfactant | 1.0 |
| Ion-exchanged water | Balance |

Print Quality Test

For the ink compositions prepared in Examples C1 to C8 and Comparative Examples C1 to C3, prints were prepared and evaluated for feathering in the same manner as described above in connection with the ink composition prepared in Examples A1 to A8 and Comparative Examples A1 to A3. The results were as summarized in the following table.

TABLE 3

Results of evaluation on print quality

| | Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| Conqueror | A | A | A | A | A | A | A | A | C | C | C |
| Favorit | A | A | A | A | A | A | A | A | D | D | D |
| Modo Copy | A | A | A | A | A | A | A | A | C | D | D |
| Rapid Copy | A | A | A | A | A | A | A | A | C | D | D |
| EPSON EPP | A | A | A | A | A | A | A | A | C | C | D |
| Xerox P | A | A | A | A | A | A | A | A | C | D | D |
| Xerox 4024 | A | A | A | A | A | A | A | A | C | D | D |
| Xerox 10 | A | A | A | A | A | A | A | A | B | D | D |
| Neenha Bond | A | A | A | A | A | A | A | A | C | D | D |
| Ricopy 6200 | A | A | A | A | A | A | A | A | B | C | D |
| Yamayuri | A | A | A | A | A | A | A | A | D | D | D |
| Xerox R | A | A | A | A | A | A | A | A | C | D | D |

What is claimed is:

1. An ink for ink jet recording, comprising at least a water-soluble colorant, a water-soluble organic solvent, water, and a compound represented by the following formula (I), (II), or (III):

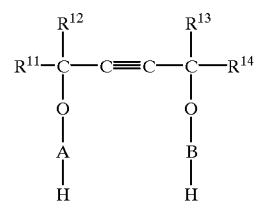

(I)

wherein $R^{11}$, $R^{12}$, $R^{13}$, and $R^{14}$ each independently represent a $C_{1-6}$ alkyl group, A and B each independently represent a group consisting of an ethyleneoxy group and/or a propyleneoxy group, provided that any one of A and B contains at least one propyleneoxy group, and the total number of ethyleneoxy groups and propyleneoxy groups is 2 to 60;

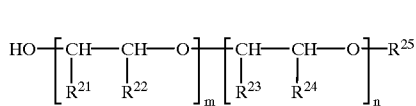
(II)

wherein
any one of $R^{21}$ and $R^{22}$ represents H with the other substituent representing $CH_3$ or H, and any one of $R^{23}$ and $R^{24}$ represents H with the other substituent representing $CH_3$ or H, when any one of $R^{21}$ and $R^{22}$ represents H, both $R^{23}$ and $R^{24}$ represent H, and when both $R^{21}$ and $R^{22}$ represent H, at least one of $R^{23}$ and $R^{24}$ represents $CH_3$, $R^{25}$ represents a butyl group, and m and n each are a number satisfying $2 \leq m+n \leq 6$;

provided that the compounds wherein $R^{21}$, $R^{22}$, $R^{23}$, and $R^{24}$ all represent H are excluded, and

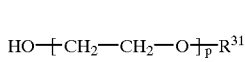
(III)

wherein $R^{31}$ represents a $C_{4-10}$ alkyl group in which $R^{31}$ is iso-butyl or t-butyl if the $C_{4-10}$ alkyl group is a $C_4$ alkyl group, and wherein p is an integer of 3 to 6.

2. The ink according to claim 1, wherein the compound represented by the formula (1) is present in the ink and has an HLB value of not less than 7.

3. The ink according to claim 1, wherein the compound represented by the formula (I) is present in the ink in an amount of 0.1 to 10% by weight.

4. The ink according to claim 1, wherein the compound represented by the formula (II) is present in the ink in an amount of 0.5 to 30% by weight.

5. The ink according to claim 1, wherein the compound represented by the formula (III) is present in the ink in an amount of 3 to 30% by weight.

6. The ink according to claim 1, wherein the water-soluble colorant comprises a water-soluble dye and/or a water-soluble pigment dispersible in water.

7. The ink according to claim 6, wherein the water-soluble colorant comprises a water-soluble pigment, and the ink further comprises an emulsion.

8. The ink according to claim 7, wherein the amount of the emulsion added is 1 to 10% by weight.

9. The ink according to claim 7, wherein the emulsion has a core/shell structure comprising a core and a shell surrounding the core, the shell comprising a crosslinked resin.

10. The ink according to claim 1, wherein the ink comprises the compound represented by the formula (I).

11. The ink according to claim 1, wherein the ink comprises the compound represented by the formula (II).

12. The ink according to claim 1, wherein the ink comprises the compound represented by the formula (III), and $R^{31}$ represents iso-butyl or t-butyl.

13. An ink jet recording method comprising the step of ejecting a droplet of an ink composition and depositing the droplet onto a recording medium to perform printing, wherein the ink composition is one according to claim 1.

14. The method according to claim 13, wherein the droplet of the ink composition is ejected through a nozzle head having a water-repellent surface.

15. The method according to claim 14, wherein the water-repellent surface of the nozzle head is a surface having thereon an eutectoid plating of tetrafluoroethylene and a non-oxidizable metal.

16. The method according to claim 14, wherein the ink for ink jet recording has a contact angle of not less than 50° on the water-repellent surface of the nozzle head.

17. The method according to claim 13, wherein the droplet of the ink composition is ejected using an electrostrictive element and, when the ink composition is not ejected, the ink composition is slightly moved by the electrostrictive element to such an extent that the ink is not delivered from the nozzle.

18. The method according to claim 13, wherein the content of the water-soluble colorant in the ink composition is 3 to 15% by weight.

19. The method according to claim 13, wherein the ink composition is filled into an ink cartridge packed with a polyurethane foam.

20. A record produced by the method according to claim 13.

* * * * *